United States Patent [19]

Murray

[11] Patent Number: 4,871,028
[45] Date of Patent: Oct. 3, 1989

[54] ARTICULATED IMPLEMENT FRAME WITH SWING HITCH

[76] Inventor: David L. Murray, 3714 N.E. Chapel Dr., Lee's Summit, Mo. 64063

[21] Appl. No.: 296,628

[22] Filed: Jan. 13, 1989

[51] Int. Cl.⁴ ............................................. A01B 73/00
[52] U.S. Cl. .................... 172/248; 172/413; 172/310
[58] Field of Search ............... 172/248, 310, 311, 459, 172/413; 56/228; 280/415.1

[56] References Cited

U.S. PATENT DOCUMENTS

| | | | |
|---|---|---|---|
| 1,815,330 | 7/1931 | Robinson | 172/310 |
| 3,288,480 | 11/1966 | Calkins | 172/413 |
| 3,515,408 | 6/1970 | Cagle | 172/248 |
| 4,552,375 | 11/1985 | Kinzenbaw | 172/248 |
| 4,607,708 | 8/1986 | Landphair | 172/311 |
| 4,765,639 | 8/1988 | Murray | 56/228 |

FOREIGN PATENT DOCUMENTS 1189364  11/1985  U.S.S.R. ............................. 172/248

*Primary Examiner*—Richard J. Johnson

[57] ABSTRACT

A wide agricultural implement is provided with a pivoted swing hitch permitting endwise transport of the implement when supported on transport wheels which are raised and lowered by power means. A latch holding the hitch in its field working position is automatically released when the transport wheels are lowered to support the implement for endwise transport. The implement frame is made up of two subframes pivotally interconnected by the rock shaft on which the transport wheels are mounted and one of the latch parts is mounted on the rock shaft.

15 Claims, 2 Drawing Sheets

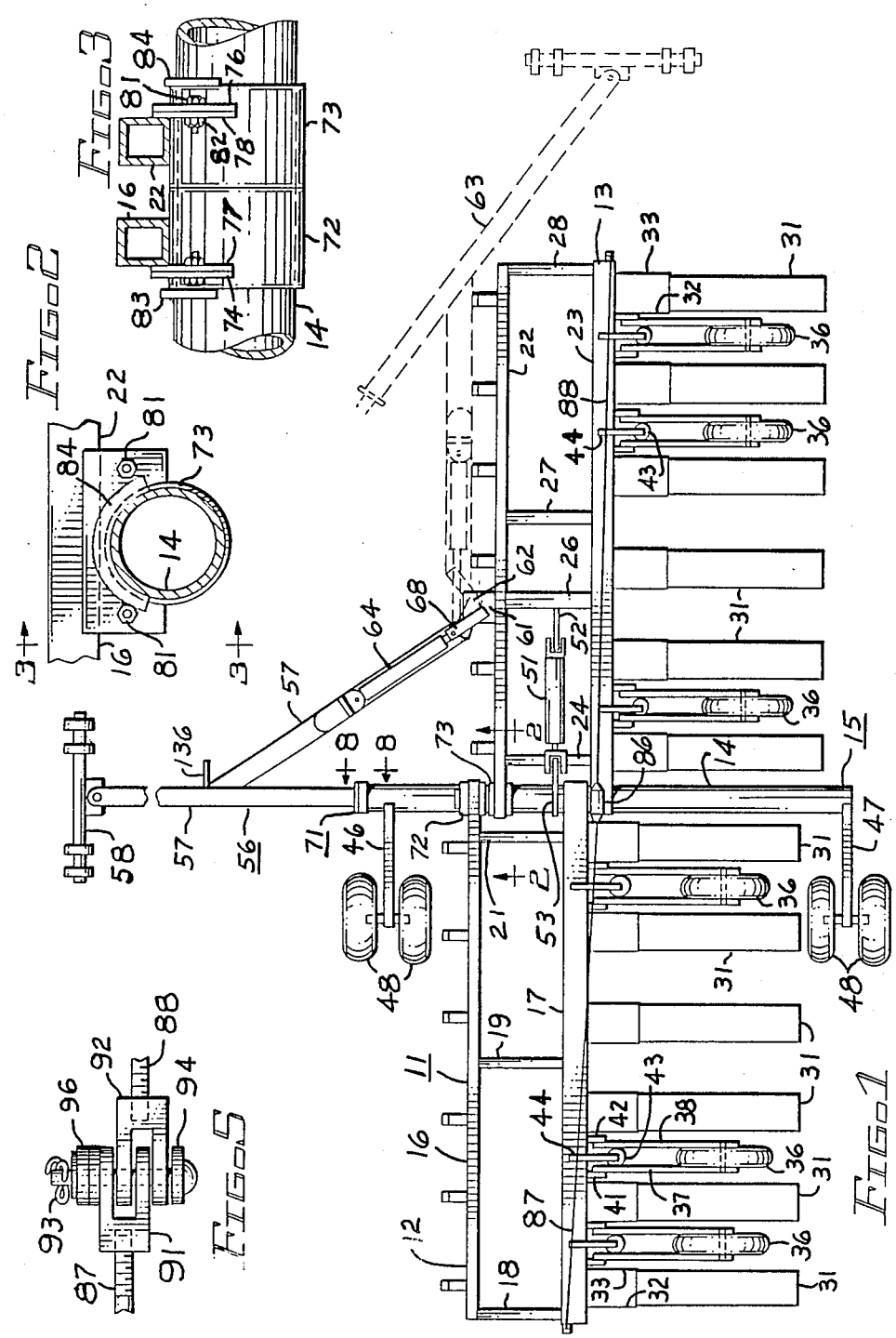

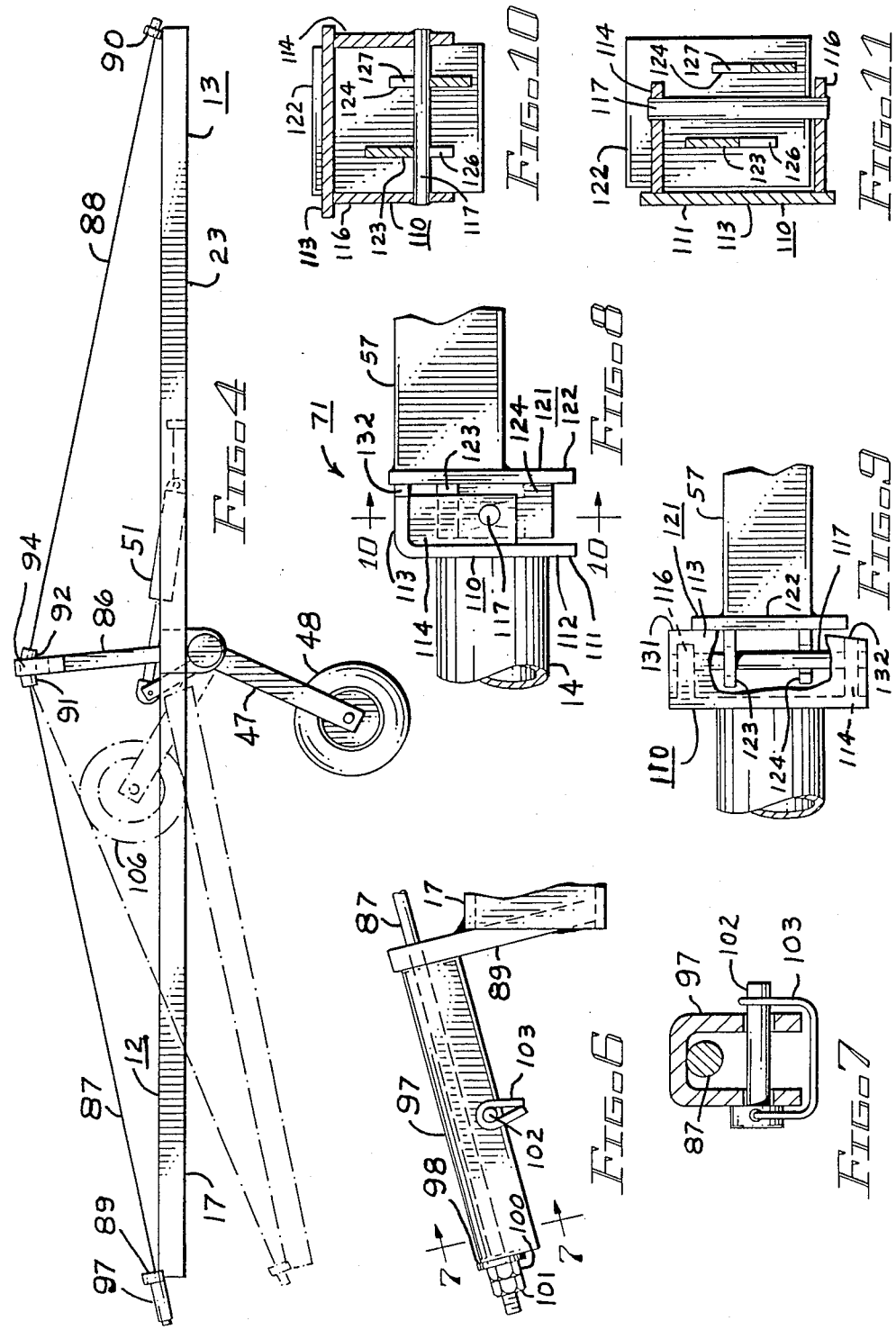

4,871,028

ARTICULATED IMPLEMENT FRAME WITH SWING HITCH

TECHNICAL FIELD

This invention relates to an agricultural implement having two frame sections pivotally interconnected on a longitudinal axis extending in the direction the implement moves during a field working operation.

PRIOR ART STATEMENT

Wide implements with swing hitches permitting endwise transport are shown in my U.S. Pat. No. 4,765,639 issued Aug. 23, 1988 on an Implement Swing Hitch Permitting Endwise Transport, U.S. Pat. No. 4,340,239 issued July 20, 1982 to Kenneth E. Shoup for a Farm Implement With Two-Way Hitch and U.S. Pat. No. 4,552,375 issued Nov. 12, 1985 to Jon E. Kinzenbaw for a Convertible Implement Frame Pulled Lengthwise in the Transport Position. U.S. Pat. No. 3,288,480 issued Nov. 29, 1966 to D. L. Calkins et al for a Rod Weeder illustrates a wide tillage implement with two frame members having their lapped adjacent ends pivotally interconnected on a longitudinal axis extending in the direction of movement of the implement during a field working operation. U.S. Pat. No. 4,607,708 issued Aug. 26, 1988 to D. K. Landphair et al for a Foldable Frame Flexing Hinge illustrates and describes an implement having a pair of end-to-end frame sections pivotally interconnected on a central longitudinal axis.

OBJECTS AND BRIEF SUMMARY OF THE INVENTION

It is a primary object of this invention to provide a wide implement with a swing hitch pivotable between a field working position in which the hitch extends forwardly from the transversely elongated frame to an endwise transport position in which the hitch extends along one side of the frame and terminates in a draft coupling end spaced from one transverse end of the frame together with a pair of transport wheels which may be raised and lowered relative to the frame and wherein releasable latch means releasably connect the hitch to the frame when the transport wheels are in their raised position and the hitch is in its field working position and wherein the latch means automatically disconnects the hitch from the frame when the transport wheels are moved to their lowered position.

It is a further object of this invention to provide an implement as outlined in the previous object wherein the transport wheels are mounted on a longitudinally extending rock shaft and the latch means includes a latch part on the rock shaft.

It is a further object of this invention to provide an implement as outlined in the previous objects wherein the implement frame includes two sections pivotally connected at their laterally inner ends to the transport wheel rock shaft.

It is a further object of this invention to provide an implement as outlined in the previous objects wherein one section of the frame is offset rearwardly of the other section and the hitch is pivotally connected to the one section.

It is a further object of this invention to provide an implement frame with two sections pivoted together on a longitudinal axis and having means for preventing downward pivoting of one section relative to the other during endwise transport.

In one embodiment of this invention the frame of the implement has a pair of subframes interconnected on a fore and aft axis and a swing hitch pivotably connected to the frame for horizontal swinging movement between field working and endwise transport positions. One subframe may be offset rearwardly of the other with the hitch being pivotally connected to the rearwardly offset subframe. A latch may be provided for releasably securing the hitch to the frame in its field working position. Transport wheels are mounted on the frame and are adjustable between raised and lowered positions and means may be provided to automatically release the latch when the transport wheels are lowered. In a preferred embodiment of the invention, the transport wheels are mounted on a rock shaft and a latch part is secured to the rock shaft so that the latch is operated automatically upon pivoting of the rock shaft. The subframes may be pivotally interconnected by the rock shaft thus eliminating the need for additional pivot means for such interconnection.

Preferably, the invention will also include means to limit downward pivoting movement of one subframe relative to the other during endwise transport.

BRIEF DESCRIPTION OF THE DRAWINGS

One embodiment of the invention is illustrated in the drawings, in which:

FIG. 1 is a top view of a wide agricultural implement in the form of a row crop planter;

FIG. 2 is a view taken on the line 2—2 in FIG. 1;

FIG. 3 is a view taken on the line 3—3 in FIG. 2;

FIG. 4 is a rear view of the implement shown in FIG. 1 with planter units and field support wheels omitted and with the transport wheels lowered to their endwise transport position;

FIG. 5 is an enlarged view of a part of FIG. 1 showing truss rods connected to a vertical post extending upward from the implement frame;

FIG. 6 is an enlarged view of a part of FIG. 4 showing a removable spacer on one of the truss rods;

FIG. 7 is a view taken on the line 7—7 in FIG. 6;

FIG. 8 is a view taken on the line 8—8 in FIG. 1 showing the releasable latching of the rock shaft and the hitch;

FIG. 9 is a top view of the structure shown in FIG. 8;

FIG. 10 is a view taken on the line 10—10 in FIG. 8; and

FIG. 11 is a view similar to FIG. 10 but with the rock shaft rotated to lower the transport wheels relative to the frame with attendant unlatching of the rock shaft from the hitch.

DETAILED DESCRIPTION OF THE DRAWINGS

Referring to FIG. 1, a twelve row planter is illustrated having a main frame 11 comprised of two laterally extending subframes 12, 13 in generally end-to-end relation to one another with their laterally inner lapped ends pivotally connected to a fore and aft extending annular tube 14 of a transport wheel rock shaft 15. Subframe 12 includes parallel horizontal tubes 16, 17 of quadrilateral cross section which are joined together by struts 18, 19, 21 welded thereto. In a similar manner subframe 13 includes a pair of horizontally disposed parallel tubes 22, 23 with struts 24, 26, 27, 28 welded hereto. Six planter units 31 are each floatingly connected in trailing relation to the tube 17 of subframe 12 by two parallel linkages 32, 33, only the upper links of which are illustrated. In a similar manner six planter units 31 are each floatingly connected in trailing relation to the tube 23 of subframe 13 by two parallel linkages 32, 33. Each of the subframes 12, 13 are supported by three field support wheels 36. Each wheel is rotatably supported on the rear ends of a pair of beams 37, 38 which have their forward ends pivotally connected on a common transverse horizontal axis to brackets 41, 42 welded to and extending rearwardly from one of the tubes 17 and 23. Each field support wheel is raised and lowered relative to its associated subframe by a double acting hydraulic jack 43 having its upper end pivotally connected to a bracket 44 welded to tube 17 or tube 23 and its lower end pivotally connected to a strut, not shown, extending between and interconnecting the beams 37, 38.

The rock shaft 15 has a pair of wheel support arms 46, 47 welded to its annular tube 14 which extend radially from the tube 14 and each rotatably supports at its free end a pair of endwise transport wheels 48. The rock shaft 15, which serves as an adjustable wheel support structure, is pivoted about the axis of the cylindrical tube 14 by a double acting hydraulic jack 51 having the closed end of its cylinder pivotally connected to a bracket 52 welded to the strut 26 of the subframe 13 and its extensible rod pivotally connected to an arm 53 welded to the annular tube 14 of the rock shaft 15.

The planter is equipped with a swing hitch or tongue 56 which includes a fore and aft extending portion 57 having a free end pivotally connected to a hitch component 58 adapted for connection to a towing tractor and an angled portion 59 having its front end welded to an intermediate part of the hitch portion 57 and its rear end pivotally connected on a vertical axis 62 to a bracket 61 welded to the tube 22 of the subframe 13. The swing hitch 56 is pivoted between its field operating position shown in solid lines in FIG. 1 to its endwise transport position shown in broken lines 63 by a double acting hydraulic jack 64 having its cylinder pivotally connected to the angled portion 57 and its extensible rod pivotally connected to a plate 68 welded to the bracket 61. The rear end of the portion 57 of the hitch 56 is selectively connected to the front end of the rock shaft 45 by a releasable latch 71 which will hereinafter be described in detail.

Referring also to FIGS. 2 and 3, the tubes 16, 22 are pivotally connected at their lapped laterally inner ends to the hollow annular tube 14 of the rock shaft 15 by pivot structures which include pivot collars 72, 73 to which vertical connector plates 74, 76 are welded. The plates 74, 76 are releasably secured to juxtaposed vertical plates 77, 78 which are welded to the frame tubes 16, 22, by releasable fastening means in the form of bolts 81 and nuts 82. The collars 72, 73 are in axially abutting relation to one another, are free to rotate on the hollow cylindrical tube 14 of the rock shaft 15 and are restrained from shifting axially on the annular tube 14 by arcuate abutments 83, 84 welded to the tube 14 in axially abutting relation to the collars 72, 73. The lapped inner ends of the frame tubes 17, 23 are pivotally connected to the annular tube 14 by pivot structure similar to that illustrated in FIGS. 2 and 3 for the pivot connections between the tubes 16, 22 and the tube 14.

Referring also to FIGS. 4-7, stabilizer means are provided to limit downward swinging movement of subframe 12 relative to subframe 13 during transport which includes an upstanding post 86 rigidly secured at its lower end to tube 23 as by welding. The stabilizer means also includes truss rods 87, 88 which extend between the top of the post 86 and brackets 89, 90 on the laterally outer ends of the frame tubes 17, 23, respectively. As shown in FIG. 5, the laterally inner ends of the rod components of the truss rods are connected to clevises 91, 92 which in turn are pivotally connected by a pin 93 to horizontally spaced upstanding brackets 94, 96 on the post 86. Before supporting the planter on the endwise transport wheels 48 a removable collar in the form of a U section spacer 97 is placed between a washer 98 and the bracket 89 welded to the end of the frame tube 17. The washer is maintained on the end of the truss rod 87 by a nut 100 and a jam nut 101 and the spacer 97 is retained on the rod 87 by a pin 102 extending through aligned openings in the side walls of the spacer 97. The pin 102 is releasably maintained in place by a resilient spring retainer clip 103. The stabilizer means or spacer 97 limits downward swinging movement of subframe 12 relative to subframe 13, in which the subframes are in horizontal alignment, while allowing upward swinging movement thereof. In a planting operation the endwise transport wheels 48 are moved to the raised position shown by broken lines 106 in FIG. 4 and in solid lines in FIG. 1. When the field support wheels 36, or the planter units 31, support the planter, the spacer 97 is removed which allows the subframes 12, 13 to pivot relative to one another as uneven ground is traversed. This pivoting or floating of the subframes 12, 13 relative to one another permits effective planting with a wide planter in fields having a wide variety of uneven ground conditions.

FIGS. 8–11 illustrate a latch for automatically latching the tongue 56 to the frame 11 when the tongue is in its field working position and the transport wheels 48 are moved from their lowered endwise transport position to their raised position. The automatic latching is achieved in the illustrated embodiment of the invention by providing a latch component 110 on the front end of the rock shaft 15 which cooperatively engages a latch component 121 on the rear end of the portion 57 of the hitch 56. The latch components 110, 121 engage in a hitched or latched condition when the rock shaft 15 is rotated to place the endwise transport wheels 48 in their raised position. The latch component 110 is mounted on the front end of the hollow annular rock shaft tube 14 and includes an L-shaped plate 111 having a vertical portion 112 welded to the front end of the shaft tube 14 and a horizontal abutment portion 113 extending forward in abutting relation to the rear end of the hitch portion 57. The front edge of the abutment portion 113 includes a forward facing abutment surface 131 and a camming surface 132 which tapers rearwardly from an intermediate point on the front edge of portion 113. The latch component 110 also includes a pair of forwardly extending brackets 114, 116 welded to the plate 111 and a latch part in the form of a rod 117, the opposite ends of which extend through aligned openings in the brackets 114, 116 and are welded to the brackets 114, 116. The latch component 121 on the hitch 56 includes a vertical plate 122 welded to the rear end of portion 57 of the hitch 56 and a pair of laterally spaced vertical latch parts in the form of notched plates 123, 124 welded to the plate 122 and extending rearwardly therefrom. The latch part 123 has a downwardly open notch 126 formed by downward diverging surfaces which extend from an arcuate surface at the apex of the notch, which is complementary to the annular shape of the rod 117. A similar but upwardly open notch 127 is formed in the latch part 124.

OPERATION

During a planting operation the hitch 56 is placed in its field operating position and the transport wheels 48 are in their raised position, which positions are shown in solid lines in FIG. 1. In this operating or working position of the implement the latch parts of the latching components will be in their latched or locked positions of engagement as illustrated in FIGS. 8, 9 and 10. The spacer 97 will be removed from the truss rod 87 and the field support wheels will be raised to lower the frame, thus placing the planter units in a ground engaging position for planting seeds. With the spacer 97 removed, the subframes 12, 13 are free to floatingly pivot about the axis of the rock shaft tube 14, thereby insuring that the planting units will plant seeds at the desired depth in fields having uneven terrain. When it is desired to transport the planter endwise, the spacer 97 is installed as shown in FIG. 6 and the field support wheels 36 are lowered so that the planter units are raised from the ground. Next the transport wheels 48 are lowered to their endwise transport position shown in solid lines in FIG. 4 by rotation of the rock shaft 15. This rotates the tube 14 about 90 degrees causing the latch component 110 to move to its unlatched position shown in FIG. 11 in which its latch part 117 is disengaged from the complementary latch parts 123, 124 on the hitch. The planter frame 11 and the hitch 56 are next pivoted relative to one another about the vertical axis 62 by extension of the jack 64 until the frame is in its endwise transport position alongside the hitch as shown in broken lines 63 in FIG. 1. The towing tractor may be driven forwardly to assist the jack 64 in pivoting the planter frame relative to the hitch. In this endwise transport position a connector plate 136 is releasably fastened to the subframe 13 by suitable means such as that shown in the hereinbefore mentioned U.S. Pat. No. 4,765,639. When the farmer wishes to again engage in a planting operation the connector plate 136 is released from the subframe 13 and the jack 64 is contracted to place the frame and hitch in a field operating position in which the latch components 110 and 121 are in approximate abutting relation. The endwise transport wheels are now raised by rotating the rock shaft clockwise about 90 degrees, as viewed in FIG. 4. This causes the latch part or rod 117 to move from its unlatched vertical position shown in FIG. 11 to its latched position shown in FIGS. 8, 9 and 10 in which the rod 117 is seated in the notches 126, 127 in the latch parts 123, 124.

From the foregoing description it is apparent applicant has provided a novel pivoted frame and hitch latching mechanism which operates automatically upon movement of the endwise transport wheels between their lowered and raised positions. The rock shaft 15 serves not only to move the endwise transport wheels 48 between their raised and lowered positions but also to pivotally interconnect the subframes 12, 13 and to automatically latch the hitch to and unlatch the hitch from the frame when the hitch is in its field working position. By offsetting the subframe 13 rearwardly of the subframe 12, the vertical pivot axis 62 can be shifted rearwardly also. This permits the hitch to be shorter than otherwise required and still place the front end of the hitch near a central transverse plane passing midway between the two sets of transport wheels 48.

The embodiments of the invention in which an exclusive property or privilege is claimed are defined as follows:

1. An agricultural implement comprising:
   a wide frame elongated horizontally in a direction transverse to the direction of travel of the implement during a field working operation including first and second laterally extending subframes in end-to-end relation to one another,
   a rock shaft having
      an annular tube whose axis extends horizontally in the direction of movement of the implement during a field working operation and
      wheel support arms spaced from one another in the axial direction of said tube, said arms being rigidly secured to said tube and extending radially outward therefrom and terminating in free ends,
   transport wheels rotatably supported on said free ends of said arms,
   pivot means pivotally connecting said first subframe to said tube for pivotal movement about said axis,
   pivot means pivotally connecting said second subframe to said tube for pivotal movement about said axis and
   power means interposed between said rock shaft and one of said subframes operable to pivot said rock shaft relative to said subframe whereby said wheels are moved between a raised position in which said implement is not supported by said wheels and a lowered position in which said implement is supported by said wheels.

2. The implement of claim 1 and further comprising a stabilizer means interconnecting said subframes operable to limit downward swinging movement of one subframe relative to the other subframe about said axis and permitting upward pivotal movement of said one subframe about said axis relative to said other subframe.

3. The implement of claim 2 wherein said stabilizer means includes a post secured to and extending upwardly from the laterally inner end of one of said subframes and a pair of truss members having laterally inner ends connected to and extending from the upper end of said post and having laterally outer ends connected to the laterally outer ends of said subframes, one of said truss members having a lost motion connection with the other of said subframes.

4. The implement of claim 3 wherein said stabilizer means includes a removable spacer between the laterally outer end of said one truss and said other subframe operable when installed to prevent downward swinging movement of said other subframe beyond a position of substantial horizontal alignment with said one subframe.

5. The implement of claim 4 wherein said truss members are rods and said spacer is of U-shaped cross section and includes a releasable fastener removably connecting said spacer to said one truss.

6. The implement of claim 1 wherein the laterally inner ends of said subframes are in lapped relation to one another in a horizontal plane with one of said subframes being offset rearwardly of said other subframe.

7. The implement of claim 6 wherein said pivot means includes annular collars pivotally encompassing said rock shaft tube and releasable fastening means securing said collars to said subframes.

8. The implement of claim 6 and further comprising a hitch having a front end adapted for connection to a towing tractor and a rear end pivotally connected to said one subframe intermediate its laterally opposite ends for swinging movement about a vertical axis between a field working position in which said hitch extends forwardly from said frame and an endwise transport position in which said hitch extends along the front of said one subframe with the front end of said hitch disposed in outwardly spaced relation to the laterally outer end of said one subframe.

9. The implement of claim 8 and further comprising latch means spaced laterally from said pivot connection of said hitch to said one subframe operable to releasably secure a portion of said hitch to a portion of said implement including a first latch part on said portion of said implement and a second latch part on said portion of said hitch, said latch parts being automatically placed in a cooperative latched relationship with one another when said hitch is in its field working position and said rock shaft is pivoted to move said transport wheels to their raised position, said latch parts being disengaged upon pivotal movement of said rock shaft to place said transport wheels in their lower position.

10. The implement of claim 9 wherein said first latch part is on said rock shaft.

11. The implement of claim 8 and further comprising a plurality of laterally spaced field support wheels, suspension components mounting said wheels on said frame, power means operatively interposed between said frame and said suspension components operable to adjust said field support wheels vertically relative to said frame and power means operatively interposed between said hitch and said one subframe operable to pivot said hitch between its field working and endwise transport positions.

12. An agricultural implement comprising:
a wide frame elongated horizontally in a direction transverse to the direction of travel of the implement during a field working operation and including two subframes pivotally interconnected on a fore and aft axis for relative pivotal movement during a field working operation,
a plurality of field support wheels spaced from one another in said transverse direction for supporting said implement during a field working operation,
suspension components operatively mounting said field support wheels on said frame,
power means interconnected between said frame and said suspension components operable to adjust said wheels vertically relative to said frame,
transport wheels for supporting said implement when the latter is transported endwise,
adjustable mounting means mounting said transport wheels on said frame,
power means operatively interposed between said mounting means and said frame operable to adjust said transport wheels vertically relative to said frame between a raised position out of ground contact and a lowered position in which said transport wheels support said implement for endwise transport,
a hitch having a front end adapted for draft connection to a towing tractor, a rear end pivotally connected to said frame on a vertical pivot axis and a rearwardly extending portion spaced laterally from said pivot axis, said hitch being swingable about said vertical axis between a forwardly extending field working position and an endwise transport position in which said front end is spaced laterally outward from one lateral end of said frame,
a latch for releasably connecting said rearwardly extending portion of said hitch to said frame including a first latch part mounted on said hitch portion and a second latch part mounted on said frame, one of said latch parts being movable relative to the other latch part between latched and unlatched positions and
latch operating means on said implement connected to said one latch part and operatively associated with said power means operable to automatically move said one latch part to its unlatched position when said power means moves said transport wheels to their lowered position.

13. The implement of claim 12 wherein said adjustable mounting means includes a rock shaft pivotally connected to said frame on an axis extending in the direction of travel of said implement during a field working operation and wherein one of said one latch parts is mounted on the front end of said rock shaft and the latter constitutes said latch operating means.

14. An agricultural implement comprising:
a wide frame elongated horizontally in a direction transverse to the direction of travel of the implement during a field working operation,
a plurality of field support wheels spaced from one another in said transverse direction for supporting said implement during a field working operation,
suspension components operatively mounting said field support wheels on said frame,
power means interconnected between said frame and said suspension components operable to adjust said wheels vertically relative to said frame,
transport wheels for supporting said implement when the latter is transported endwise,
adjustable mounting means mounting said transport wheels on said frame including a rock shaft pivotally connected to said frame on an axis extending in the direction of travel of said implement during a field working operation,
power means operatively interposed between said mounting means and said frame operable to adjust said transport wheels vertically relative to said frame between a raised position out of ground contact and a lowered position in which said transport wheels support said implement for endwise transport,
a hitch having a front end adapted for draft connection to a towing tractor, a rear end pivotally connected to said frame on a vertical pivot axis and a rearwardly extending portion spaced laterally from said pivot axis, said hitch being swingable about said vertical axis between a forwardly extending field working position and an endwise transport position in which said front end is spaced laterally outward from one lateral end of said frame and
a latch for releasably connecting said rearwardly extending portion of said hitch to said frame including a first latch part mounted on said hitch portion and a second latch part mounted on the front end of said rock shaft, said second latch part being movable relative to said first latch part between latched and unlatched positions by pivotal movement of said rock shaft, said second latch part being automatically moved to its unlatched position when said power means moves said transport wheels to their lowered position.

15. An agricultural implement comprising:

a wide frame elongated horizontally in a direction transverse to the direction of travel of the implement during a field working operation, a plurality of field support wheels spaced from one another in said transverse direction for supporting said implement during a field working operation, suspension components operatively mounting said field support wheels on said frame, power means interconnected between said frame and said suspension components operable to adjust said wheels vertically relative to said frame, transport wheels for supporting said implement when the latter is transported endwise, adjustable wheel support structure mounting said transport wheels on said frame, power means operatively interposed between said wheel support structure and said frame operable to adjust said transport wheels vertically relative to said frame between a raised position out of ground contact and a lowered position in which said transport wheels support said implement for endwise transport, a hitch having a front end adapted for draft connection to a towing tractor, a rear end pivotally connected to said frame on a vertical pivot axis and a rearwardly extending portion spaced laterally from said pivot axis, said hitch being swingable about said vertical axis between a forwardly extending field working position and an endwise transport position in which said front end is spaced laterally outward from one lateral end of said frame, a latch for releasably connecting said rearwardly extending portion of said hitch to said frame including a first latch part mounted on said hitch portion and a second latch part mounted on said frame, one of said latch parts being movable relative to the other latch part between latched and unlatched positions and a mechanical interconnection between said one latch part and said wheel support structure whereby said one latch part is automatically moved to its unlatched position when said power means adjusts said wheel support structure to move said transport wheels to their lowered position.

* * * * *

UNITED STATES PATENT AND TRADEMARK OFFICE
CERTIFICATE OF CORRECTION

PATENT NO.   :   4,871,028
DATED        :   October 3, 1989
INVENTOR(S)  :   David L. Murray It is certified that error appears in the above-identified patent and that said Letters Patent is hereby corrected as shown below:

Column 7, Line 20, cancel ---lower--- and substitute ---lowered---

Show name of assignee, Deutz-Allis Corporation, on cover page.
Norcross, Georgia
Title page, before Item [57] insert --Attorney, Agent, or Firm
Charles L. Schwab--

Signed and Sealed this

Twentieth Day of November, 1990

*Attest:*

HARRY F. MANBECK, JR.

*Attesting Officer*

*Commissioner of Patents and Trademarks*